R. C. BAILY.
COMBINED FILTER AND STRAINER FOR COFFEE POTS.
APPLICATION FILED AUG. 3, 1908.
915,324.
Patented Mar. 16, 1909.
2 SHEETS—SHEET 1.
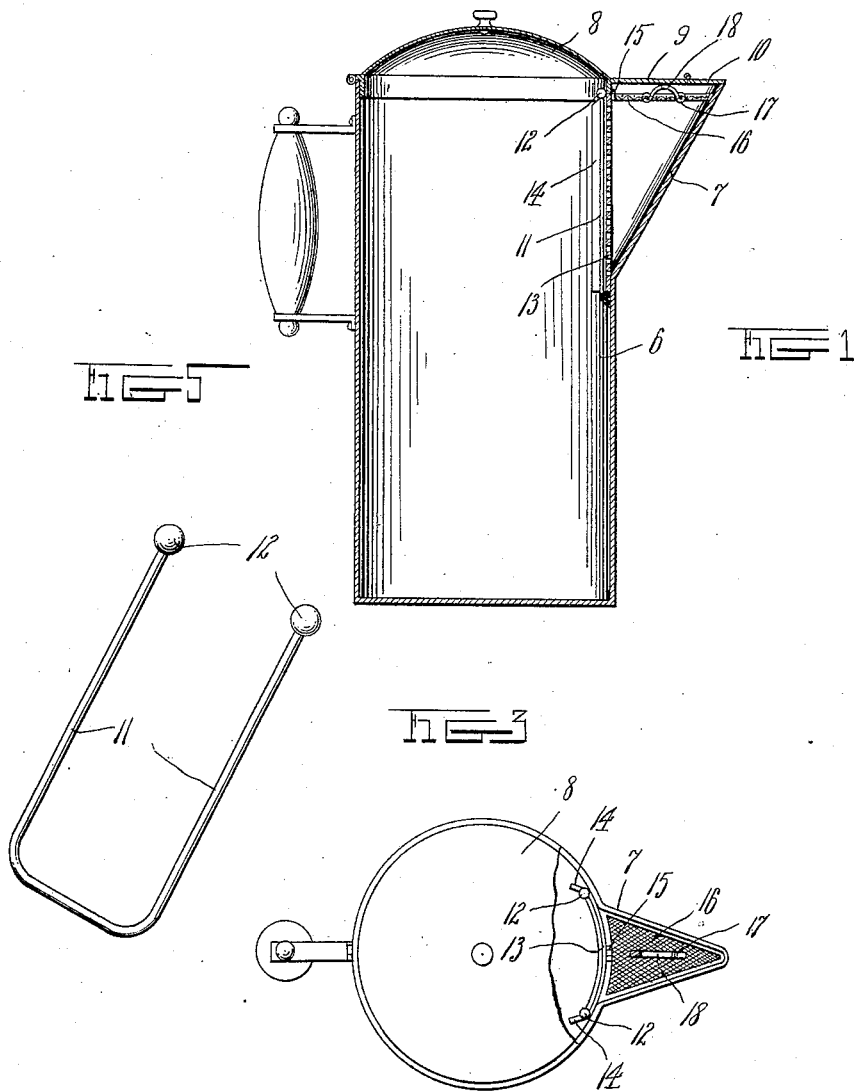
Witnesses
J. H. Crawford
Inventor
Rose C. Baily,
By
Attorneys R. C. BAILY.
COMBINED FILTER AND STRAINER FOR COFFEE POTS.
APPLICATION FILED AUG. 3, 1908.
915,324.
Patented Mar. 16, 1909.
2 SHEETS—SHEET 2.
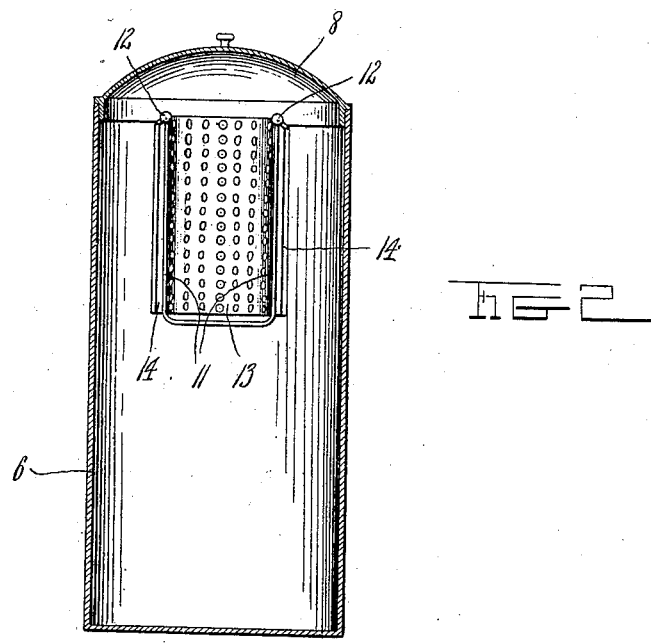
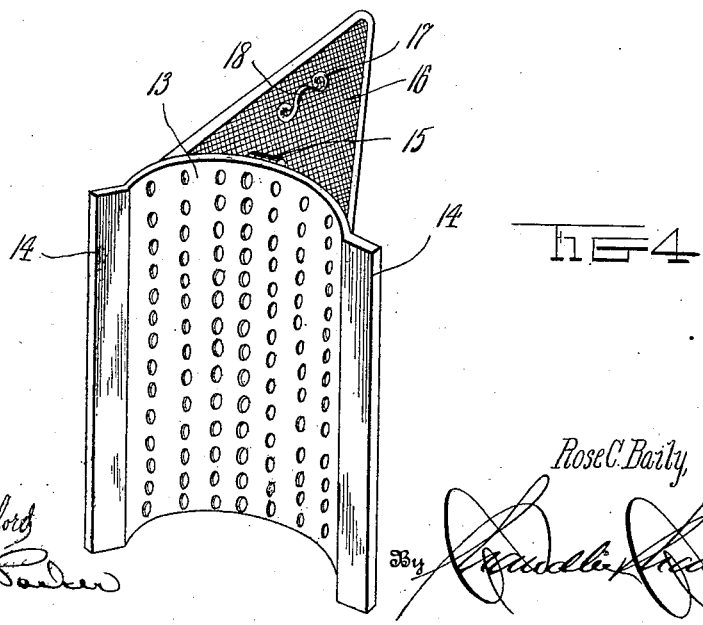

UNITED STATES PATENT OFFICE.

ROSE C. BAILY, OF GIBSON CITY, ILLINOIS.

COMBINED FILTER AND STRAINER FOR COFFEE-POTS.

No. 915,324.   Specification of Letters Patent.   Patented March 16, 1909.

Application filed August 3, 1908. Serial No. 446,714.

*To all whom it may concern:*

Be it known that I, ROSE C. BAILY, a citizen of the United States, residing at Gibson City, in the county of Ford, State of Illinois, have invented certain new and useful Improvements in a Combined Filter and Strainer for Coffee-Pots; and I do hereby declare the following to be a full, clear, and exact description of the invention, such as will enable others skilled in the art to which it appertains to make and use the same.

The invention relates to a combined filter and strainer for coffee and tea pots or other vessels.

The primary object of the invention is the provision of a combined filter and strainer adapted to be removably connected at the spout portion of a coffee pot or the like so as to filter and strain the coffee as it is poured from the pot and to enable the spout portion thereof to be easily and quickly cleaned and also permit the filter and strainer to be readily cleaned.

Another object of the invention is the provision of a combined filter and strainer for coffee or other pots which can be easily and quickly attached and detached to the spout of the pot, and the construction of which being simple, thoroughly efficient in operation and inexpensive in the manufacture.

With these and other objects in view the invention for example consists in the construction, combination and arrangement of parts as will be hereinafter more fully described and as illustrated in the accompanying drawings which disclose the preferred form of embodiment of the invention. It is to be understood however that changes, variations and modifications may be made such as come properly within the scope of the claims hereunto appended without departing from the spirit of the invention.

In the drawings: Figure 1 is a longitudinal sectional view through a pot and its spout with the combined filter and strainer mounted therein. Fig. 2 is a vertical sectional view through the coffee pot showing in plan the mounting of the combined filter and strainer in the spout of the pot. Fig. 3 is a top plan view of a coffee pot with the cover broken away. Fig. 4 is a detail perspective view of the combined filter and strainer detached from the coffee pot. Fig. 5 is a detail perspective view of the spaced guide members.

Similar reference characters indicate corresponding parts throughout the several views in the drawing.

In the drawings, the numeral 6 designates the body of the coffee pot which is preferably of cylindrical shape and of the same diameter throughout its length and having a pouring spout 7 and at a point opposite the latter and fixed to the body 6 is a hinged cover 8 having a rigid extension 9 correspondingly shaped with respect to the said spout and adapted to normally close a greater portion of the same. Connected to the extension 9 is a hinged top 10 which is adapted to normally close the outer extremity of the said spout.

Connected to the inner wall of the body 6 of the coffee pot are spaced parallel yieldable arms 11 having ball terminals 12 and which arms lie adjacent the inlet of the spout and close to the body 6 on opposite sides of said inlet. Across the inlet of the spout 7 is a reticulated plate forming a filter 13 the same having oppositely disposed flanges 14 engaging the arms 11 to removably support the said filter in the body of the pot.

Connected near the upper end of the reticulated plate forming the filter 13 by a hinge 15 is a wire mesh strainer 16 the latter correspondingly shaped and extended into the spout 7 of the coffee pot. Mounted upon the wire mesh strainer 16 is a wire 17 being bent on itself to form a handle or gripping portion 18 rising from the said strainer. The said handle or gripping extremity 18 is positioned on the strainer 16 so as to lie directly under the extension of the cover so as to prevent the displacement of the strainer when the cover is in a closed position and in the act of pouring coffee from the body of the pot. The ball terminals 12 of the guide arms 11 serve to maintain the reticulated plate forming the filter 13 in locked position and against accidental upward displacement when mounted across the inlet of the spout within the body of the coffee pot. Also the ball terminals when in engagement with the flanges 14 serve to guide the filter 13 into its proper position across the spout inlet.

It is obvious that when it is desired to clean the spout 7 without the removal of the filter 13 from the body of the pot the handle or gripping extremity 18 is grasped and upon raising the strainer 16 thereby full access is had to the interior of the spout of the coffee pot. Now to remove the filter 13 the flanges 14 are slid from under the guide arms 11 so that the reticulated plate forming the filter will be disconnected from the body of the coffee pot.

What is claimed is—

1. The combination with a vessel having a pouring spout, of a cover fixed to the vessel and having a rigid extension projecting over a portion of the spout spaced yieldable guide arms fixed to the vessel adjacent the spout inlet, a reticulated plate removably mounted between the guide arms, ball terminals on said guide arms to hold the reticulated plate against accidental displacement, a strainer hinged to the reticulated plate and extending into the spout and correspondingly shaped thereto, and means on the strainer and coöperative with the extension to maintain said strainer in an operative position in the spout.

2. The combination with a vessel having a pouring spout and fixed cover therefor, of a pair of guide arms arranged adjacent the inlet of the spout, a reticulated plate forming a filter having opposed flanges to engage the guide arms, ball terminals on said guide arms to lock the reticulated plate in the vessel, a strainer hinged to said plate and extending into the spout and a handle rising from said strainer in position for action with the cover to hold the strainer in operative position within the spout.

3. The combination with a vessel having a pouring spout and a cover fixed to the vessel and extending partly over the spout, of spaced guide arms fixed to the vessel adjacent the inlet of the pouring spout, a reticulated plate detachably connected across the inlet by the guide arms, a strainer pivotally connected to the reticulated plate, and means acted upon by the cover to hold the strainer normally across the spout.

4. In combination with a pot having a spout, of a cover fixed to the pot and extending partially over the spout, a combined filter and strainer comprising a perforated plate forming a filter, a plate hinged to said perforated plate and having a plurality of openings of decreased size with respect to the openings in the first mentioned plate and adapted to be detachably inserted in the spout, and means acted upon by the cover to normally hold the strainer across the spout.

In testimony whereof, I affix my signature, in presence of two witnesses.

ROSE C. BAILY.

Witnesses:
   JOHN A. PENCE,
   E. MATTINSON.